United States Patent [19]

Secco et al.

[11] Patent Number: 4,741,592
[45] Date of Patent: May 3, 1988

[54] HYDROGEN ABSORBING COMPOSITION FOR OPTICAL FIBER CABLES AND CABLES CONTAINING SUCH COMPOSITION

[75] Inventors: Alessandro Secco, Bareggio; Pietro Anelli; Franco Pasini, both of Milan, all of Italy

[73] Assignee: Societa' Cavi Pirelli S.p.A., Milan, Italy

[21] Appl. No.: 846,576

[22] Filed: Mar. 31, 1986

Related U.S. Application Data

[63] Continuation-in-part of Ser. No. 723,901, Apr. 16, 1985, Pat. No. 4,718,747, and Ser. No. 798,598, Nov. 15, 1985, Pat. No. 4,688,889.

[30] Foreign Application Priority Data

Apr. 12, 1985 [IT] Italy ................................ 20310 A/85

[51] Int. Cl.⁴ ................................................. G02B 6/44
[52] U.S. Cl. .............................. 350/96.23; 350/96.10; 350/96.34; 502/158
[58] Field of Search ............... 502/158, 159, 161, 169, 502/401, 402; 350/96.23, 96.34

[56] References Cited

U.S. PATENT DOCUMENTS

| | | | |
|---|---|---|---|
| 4,036,944 | 7/1977 | Blytas | 502/402 X |
| 4,080,490 | 3/1978 | Dawans et al. | 502/159 X |
| 4,110,425 | 8/1978 | Bühl et al. | 502/159 X |
| 4,235,748 | 11/1980 | Berchielli et al. | 502/159 X |
| 4,433,063 | 2/1984 | Bernstein et al. | 502/402 |
| 4,481,303 | 11/1984 | McIntyre et al. | 502/159 |
| 4,528,281 | 7/1985 | Sutt, Jr. | 502/402 |

*Primary Examiner*—William L. Sikes
*Assistant Examiner*—Akm E. Ullah
*Attorney, Agent, or Firm*—Brooks Haidt Haffner & Delahunty

[57] ABSTRACT

A hydrogen absorbent composition for protecting optical fibers from damage due to attack by hydrogen, and optical fiber cables and components containing such composition. The composition comprises a mixture of an unsaturated polymer obtained by the polymerization of at least conjugated diene-monomers and of a catalyst selected from the transition metals, the inorganic and organometallic salts of the transition metals, the organometallic acids of the transition metals or mixtures thereof, which catalyst may be supported on an inert carrier.

28 Claims, 1 Drawing Sheet

4,741,592

HYDROGEN ABSORBING COMPOSITION FOR OPTICAL FIBER CABLES AND CABLES CONTAINING SUCH COMPOSITION

This application is a continuation-in-part of application Ser. No. 723,901, filed Apr. 16, 1985, now U.S. Pat. No. 4,718,747 and entitled "Optical Fiber Cable with Hydrogen Combining Layer" and of application Ser. No. 798,598, filed Nov. 15, 1985, now U.S. Pat. No. 4,688,889 and entitled "Hydrogen Fixing Fillers for Optical Fiber Cables and Components and Cables and Components Containing Such Filler", both such applications being assigned to the assignee of the present application.

The present invention relates to a hydrogen absorbing composition for optical fiber telecommunication cables and to cables and to their components which incorporate said composition.

Hydrogen is harmful to optical fiber cables, no matter of what type they may be, since, should the optical fibers come into contact with the hydrogen, serious adverse effects could arise such as, for example, the mechanical degradation of the optical fibers and an attenuation of the signals transmitted in the ranges of the wave-lengths used for telecommunications.

Hydrogen can reach a fiber either from the outside environment or from inside the cable itself.

The hdyrogen can be formed inside of a cable, for example, through electro-chemical phenomena taking place between water in contact with the metallic components made, for example, of galvanized steel or of aluminum alloys, forming part of the cable, or else, through the chemical reaction which takes place between water and the plastic materials out of which other cable components are made.

Another cause of hydrogen forming inside a cable is the emission of hydrogen by the materials, themselves, out of which the cable is constituted and which have absorbed hydrogen during the manufacture thereof.

Whereas the quantity of hydrogen which can be formed inside a cable is small, the same cannot be stated with regard to the quantity of hydrogen which reaches a cable from the outside environment. Consider, for example, the great quantities of hydrogen which can be formed in particular environments, for example, in thermonuclear plants or in connection with the underwater equipment provided with cathodic protection, such as platforms for submarine drilling, petroleum pipelines, and such like.

In said U.S. patent application Ser. No. 798,598, there is described a composition based upon unsaturated silicone compounds acting as "fillers" for optical fiber cables which are adapted to chemically absorb all and any traces of hydrogen and which, in this way, prevent the hydrogen from reaching the optical fibers.

The composition, according to the last-mentioned application, is very capable of efficiently protecting the optical fibers of a cable from a quantity of hydrogen in the same order of magnitude as the hydrogen emitted from the materials out of which a cable is formed. However, said composition does not appear to give a satisfactory protection in cases where an optical fiber cable is disposed in an environment saturated with hydrogen.

One object of the present invention is to provide a protection against any damage to optical fiber cables which is caused by hydrogen.

In particular, the principal object of the present invention is a protection which, in chemically blocking the hydrogen, provides a protective barrier for the optical fibers of a cable against both, the hydrogen which can be formed inside the cable itself as well as the hydrogen coming, in large quantities, from the environment outside the cable.

In accordance with the present invention, an absorbent hydrogen composition, for optical fiber cables and their components, is formed by a mixture comprising an unsaturated polymer which is obtained through the polymerization of at least conjugated diene-monomers and a catalyst, selected from among the transition metals, the inorganic and organometallic salts of the transition metals and the organometallic acids of said transition metals, by themselves or supported by inert materials.

In accordance with the present invention, an optical fiber cable, having at least one mechanically-resistant component, comprises a signal transmitting core and a sheath which encloses the core, which cable is characterized by the fact of incorporating an unsaturated polymeric composition which is constituted by a mixture comprising an unsaturated polymer, obtained through the polymerization of at least conjugated diene-monomers, and a catalyst selected from among the transition metals, the inorganic and the organometallic salts of the transition metals and the organometallic acids of said transition metals, by themselves, or supported by inert materials.

Also, the present invention includes an optical fiber cable component which is characterized by the fact of incorporating an absorbent hydrogen composition consisting of a mixture comprising an unsaturated polymer, obtained through the polymerization of at least conjugated diene-monomers, and a catalyst selected from among the transition metals, the inorganic and organometallic salts of said transition metals and the organometallic acids of said transition metals, by themselves, or supported by inert materials.

In this text, by the term "polymer" is meant a substance consisting of molecules formed by the linking of at least two monomer units. Moreover, in this text, by the term "conjugated diene-monomer" is meant a monomer whose molecule is formed by a series of carbon atoms, directly linked to one another and containing two double-bonds, localized on adjacent carbon atoms or on the carbon atoms in positions 1 and 3.

Other objects and advantages of the present invention will be apparent from the following detailed description of the presently preferred embodiments thereof, which description should be considered in conjunction with the accompanying drawings in which.

Figure 1:
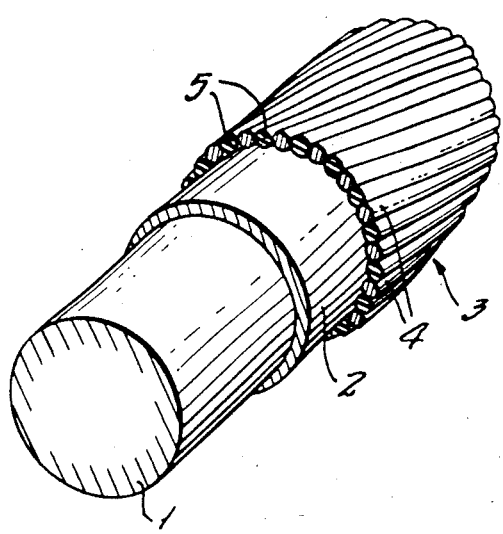
FIG. 1 is a schematic, perspective view of a length of cable according to the invention which is provided with a metallic armoring surrounding the sheath.

In a cable according to the invention, the protection against the damage caused to the optical fibers by hydrogen is obtained with a composition that chemically blocks or fixes the hydrogen to it. Said composition is constituted by a mixture, the two essential components of which are set forth hereinafter.

The first component is an unsaturated polymer which is obtained through the polymerization of at least conjugated diene-monomers. The unsaturated polymer can either be a homopolymer, a copolymer, a terpolymer or one of these grafted with monomers which each contain at least one unsaturated group.

Should the unsaturated polymer be a homopolymer, the homopolymer is obtained preferably, but not necessarily, through the polymerization of monomers which are selected from among butadiene, pentadiene, methylbutadiene and 2-chlorobutadiene.

In the unsaturated homopolymer, the monomers can be linked in different ways. The monomers can all be linked in positions 1 and 4, or else all the monomers can be linked, one with the other, in positions 1 and 2. As an alternative, one part of the monomers are linked in positions 1 and 4 and another part in positions 1 and 2.

Examples of homopolymers, which are appropriate for forming the first component of the mixture are 1,4-polybutadiene; 1,2-polybutadiene; 1,2- and 1,4-polybutadiene; polyisoprene, natural rubber and polychloroprene.

Should the unsaturated polymer be a copolymer, the copolymer is obtained, preferably, but not necessarily exclusively, through polymerization between a first monomer, selected from among butadiene, pentadiene, methylbutadiene, and 2-chlorobutadiene and a second monomer, selected from among styrene, 4-vinylpyridine and acrylonitrile.

Examples of copolymers appropriate for forming the first component of a mixture, according to the invention, are butadiene-styrene copolymer and butadiene-acrylonitrile copolymer.

When the unsaturated polymer is a terpolymer, the terpolymer is obtained, preferably but not necessarily, through the polymerization of styrene, of 4-vinylpyridine, of acrylonitrile and of a third monomer selected from among butadiene, pentadiene, methylbutadiene and 2-chlorobutadiene.

An example of a terpolymer which is appropriate for forming the first component of a compound, according to the invention, is the terpolymer of butadiene-styrene-acrylonitrile.

Whenever the unsaturated polymer is grafted with monomers, each of which contains an unsaturated group, said polymer is obtained through grafting a homopolymer, a copolymer or a terpolymer (selected from those previously described) with unsaturated groups, for example, selected from among divinylsulfone or vinylcrotonate and, in general, selected from among monomers which, after being coupled, contain active, unsaturated groups of vinyls, allyls, and similar groups.

An example of a grafted unsaturated polymer which is appropriate for forming the first component of a mixture, according to the invention, is butadiene-styrene grafted with divinylsulfone and obtained by means of a radical initiator using methods which are per se known to those skilled in the art.

The other essential component of the mixture, forming the composition of the present invention, is a catalyst selected from among the transition metals, the inorganic and organometallic salts of the transition metals, the organometallic acids of said transition metals and mixtures thereof.

These catalysts can be used as such or as an alternative, supported by inert materials.

Examples of catalysts are platinum powder, palladium powder, nickel powder, the organic or organometallic salts of such metals, iron pentacarbonyl and copper chromite, either utilized as such or supported by inert materials, such as, for example, animal black or vegetable black, known to those skilled in the art under the name of "charcoal".

The mixture forming the absorbent hydrogen composition, according to the invention, can either be in a liquid state, or in a solid state.

Moreover, said mixture can either be used as such or substances which are non-reactive to hydrogen can be added to it when required, in a manner known by those skilled in the art, for permitting the introduction of the mixture into a cable.

However, if inert substances be present in the mixture, it is essential for the mixture to always be capable of chemically blocking, or fixing, all the hydrogen which can reach the optical fibers of a cable, or else, be formed inside the cable.

Those skilled in the art, are capable of determining, for each cable, the quantity of hydrogen to be encountered. Once this quantity has been determined, those skilled in the art are able to estabish, for each possible composition according to the invention, the minimum quantity of unsaturated polymer on the basis of knowledge of the stoichiometry and of the kinetics of the hydrogenization of the unsaturated groups contained in the selected polymer.

There will now be given, solely by way of example, some specific embodiments of compositions according to the invention, either in a liquid, or in a solid state, the results of experimental tests and the methods of execution for the compositions described which show the capacity of these compositions to absorb, at ambient temperature, both traces, as well as large quantities of hydrogen.

EXAMPLE 1

The absorbent hydrogen composition of this example is in a liquid state and its formulation is as follows:

(a) 100 parts by weight of 1,2- and 1,4-polybutadiene having a molecular weight of 1800 and containing 80% of 1,2-butadiene units and 20% of 1,4-butadiene units; and (b) 0.3 parts by weight of charcoal powder containing 5% of palladium, the latter being in the form of granules having dimensions of less than 40 microns.

EXAMPLE 2

The absorbent hydrogen composition of this example is in a liquid state and its formulation is as follows:

(a) 100 parts by weight of butadiene-styrene copolymer having a molecular weight of 3400 and containing 25% of styrene units, 15% of 1,2-butadiene units and 60% of 1,4-butadiene units; and (b) 0.3 parts by weight of charcoal powder containing 5% of palladium, the latter being in the form of granules having dimensions of less than 40 microns.

EXAMPLE 3

The absorbent hydrogen composition of this example is in a liquid state and its formulation is as follows:

(a) 100 parts by weight of butadiene-styrene-acrylonitrile terpolymer having a molecular weight of 2500 and containing 10% of styrene units, 25% of acrylonitrile units, 52% of 1,2-butadiene units and 13% of 1,4-butadiene units; and (b) 0.3 parts by weight of carbon powder containing 5% of palladium, the latter being in the form of granules having dimensions of less than 40 microns.

EXAMPLE 4

The absorbent hydrogen composition of this example is in a liquid state and its formulation is as follows:

(a) 100 parts by weight of butadiene-styrene-divinylsulfone, having a molecular weight of 13,750 and containing 43% of 1,4-butadiene units and 37% of styrene units and 20% of divinylsulfone units; and (b) 0.3 parts by weight of copper chromite powder in the form of granules having dimensions of less than 40 microns.

EXAMPLE 5

The absorbent hydrogen composition of this example is in a solid state and its formulation is as follows:

(a) 100 parts by weight of 1,2- and 1,4-polybutadiene having a molecular weight of 246,000 and containing 77% of 1,2-butadiene units and 23% of 1,4-butadiene units; and (b) 0.3 parts by weight of carbon powder containing 5% of palladium, the latter being in the form of granules with dimensions of less than 40 microns.

EXAMPLE 6

The absorbent hydrogen composition of this example is in a solid state and its formulation is as follows:

(a) 100 parts by weight of butadiene-styrene copolymer having a molecular weight of 400,000 and containing 23% of styrene units and 77% of butadiene units of which 90% is 1,2-butadiene; and (b) 0.3 parts by weight of carbon powder containing 5% of palladium, the latter being in the form of granules with dimensions of less than 40 microns.

EXAMPLE 7

The absorbent hydrogen composition of this example is in a solid state and its formulation is as follows:

(a) 100 parts by weight of butadiene-styrene-acrylonitrile terpolymer having a molecular weight of 10,500 and containing 25% of 1,2-butadiene units, 50% of styrene and 25% of acrylonitrile units; and (b) 0.5 parts by weight of copper chromite powder in the form of granules having dimensions of less than 40 microns.

EXAMPLE 8

The absorbent hydrogen composition of this example is in a solid state and its formulation is as follows:

(a) 100 parts by weight of butadiene-styrene-divinylsulphone having a molecular weight of 140,000 and containing 43% of 1,4-butadiene units, 37% of styrene units and 20% of divinylsulfone units;

(b) 0.3 parts by weight of copper chromite powder in the form of granules having dimensions of less than 40 microns.

EXAMPLE 9

The absorbent hydrogen composition of this example is a compound in a substantially solid state, and its formulation is as follows:

| | |
|---|---|
| (a) 1,2-polybutadiene | 100 parts by weight |
| (b) carbon powder containing 5% of palladium, the latter being in the form of granules having dimensions of less than 40 microns | 0.3 parts by weight |
| (c) plasticizing mineral oil (for example: paraffin oil) | 50 parts by weight |
| (d) mineral fillers (for example: calcium carbonate) | 100 parts by weight |

The compositions described were obtained in the following manner. The compositions, in a liquid state, were formed by uniformly dispersing the catalyst in the liquid polymer by means of mechanical agitation.

The compositions, in a solid state, were obtained by mixing the ingredients of the said compositions, in a mechanical mixer of the per se known type, used for producing compounds.

Experimental tests were carried out with all of the compositions of the above examples, for determining their hydrogen absorption capacities.

The methods of carrying out the experimental tests, for determining the hydrogen-absorption capacity of the compositions according to the invention, are as follows.

The equipment utilized comprises a glass ampoule of 175 $cm^3$ from which a glass tube extends, the tube terminating in a two-way tap, one outlet of which is connected to a vacuum pump and the other outlet of which is connected to a phial containing hydrogen. A mercury gauge is attached to an intermediate portion of the glass tube.

In the case of compositions in a liquid state (examples 1 to 4), 1 g of the composition was smeared on the walls of the ampoule with adding, whenever necessary, a silica gel for merely increasing the viscosity of the composition and for causing it to adhere to the ampoule wall.

In the case of the compositions in a solid state (examples 5 to 9) a rectangular film of 1 g, having sides of a length of 330 mm and 30 mm, was introduced into the ampoule.

After the introduction of a sample of the composition into the ampoule, the latter was sealed tight and successively, by means of the vacuum pump, a barometric vacuum was created inside it, the achievement of the vacuum being verified by means of the mercury gauge.

At this point, the vacuum pump connection was turned off, and the ampoule was put into communication with the phial containing the hydrogen so that the latter could flow into the ampoule itself and come into contact with and react chemically with the composition contained therein.

The tests were carried out at a temperature of 20° C., with predetermined quantities of hydrogen being introduced into the ampoule, measured on the basis of the pressure of the hydrogen inside said ampoule, and observing, as a function of the time, the course of the pressure reduction in the ampoule.

Two tests, with different initial quantities of hydrogen being introduced into the ampoule, were carried out.

The first test was carried out by introducing, into the ampoule, hydrogen at a pressure of 760 mm of mercury corresponding to a quantity of 0.152 g of hydrogen and 160 normal $cm^3$ of hydrogen.

The second test was effectuated by introducing hydrogen into the ampoule at a pressure of 200 mm of mercury which corresponds to a quantity of $0.38 \times 10^{-2}$ g of hydrogen and 48.6 normal cm$^3$ of hydrogen.

In each test, the pressure of the hydrogen was determined after 360 hours. The corresponding quantity of hydrogen, expressed in normal cm$^3$, which was chemically absorbed by 1 g of the composition was then calculated.

The results of the two experimental tests for each composition are set forth in the following TABLES I and II.

TABLE I

| | (Results of First-Test) | | | | | | | | |
|---|---|---|---|---|---|---|---|---|---|
| Composition Example | 1 | 2 | 3 | 4 | 5 | 6 | 7 | 8 | 9 |
| Hydrogen Pressure in Ampoule after 360 hrs., mm mercury - | 0 | 475 | 0 | 366 | 0 | 0 | 285 | 366 | 156 |
| Hydrogen Absorbed after 360 hrs in normal cm$^3$/g composition | 160 | 60 | 160 | 83 | 160 | 160 | 100 | 83 | 127 |

TABLE II

| | (Results of second test) | | | | | | | | |
|---|---|---|---|---|---|---|---|---|---|
| Composition Example | 1 | 2 | 3 | 4 | 5 | 6 | 7 | 8 | 9 |
| Hydrogen Pressure in ampoule after 360 hrs., mm mercury- | 0 | 0 | 0 | 0 | 0 | 0 | 0 | 0 | 0 |
| Hydrogen absorbed after 360 hrs. in normal cm$^3$/g composition- | 48.6 | 48.6 | 48.6 | 48.6 | 48.6 | 48.6 | 48.6 | 48.6 | 48.6 |

From the data set forth in TABLE I, it is apparent that the compositions of Examples from 1 to 9 (1 g in quantity and at room temperature), are capable of absorbing specific quantities of hydrogen. The compositions 1, 3, 5 and 6 absorbed the entire quantity of hydrogen used during the test whereas the other compositions absorbed only a part of said hydrogen. However, by proportionately increasing the weight of the compositions 2, 4, 7, 8 and 9, total absorption of the hydrogen can be obtained.

From the data set forth in TABLE II, it is apparent that all of the compositions absorbed the entire quantity of the hydrogen used in the test.

Hence, the tests demonstrate that the compositions prevent any diffusion of large quantities (TABLE I) and small quantities (TABLE II) of hydrogen and, therefore, when they are introduced into an optical fiber cable, no matter in what manner this is effectuated, they are capable of protecting the said fibers against the action of hydrogen.

As previously stated, cables incorporating, in any way whatsoever, the absorbent hydrogen compositions, according to the present invention, are within the scope of the invention.

A mechanically resistant element, is present in all kinds of optical fiber cables. In this text, by the term "mechanically resistant element" is meant, either an element such as, for example, an armoring, the sole purpose of which is to resist mechanical stresses, or any component part of the cable which, besides performing its intended function, also acts as a mechanically resistant element such as, for example, the sheath, the tubes housing the optical fibers, a structural shape provided with grooves for receiving optical fibers, etc.

The cable of FIG. 1 comprises an optical signal transmitting unit 1 which can be the core of any type of optical fiber cable. The signal transmitting unit 1 is enclosed in a metallic or plastic sheath 2, around which an armoring 3 is disposed.

The armoring 3 is formed by a plurality of metallic wires 4, for example, steel wires, between which are inserted structural shapes or filaments 5, formed of, or containing, an absorbent hydrogen composition according to the invention. Preferably, but not necessarily, between each two adjacent metallic wires 4, there is interposed a structural shape or filament 5 of the type described.

According to an alternative embodiment of the cable shown in FIG. 1, the structural shapes, or filaments 5, are omitted, and at least some of the wires 4 are covered with a layer of the absorbent hydrogen composition, according to the invention.

Figure 2:
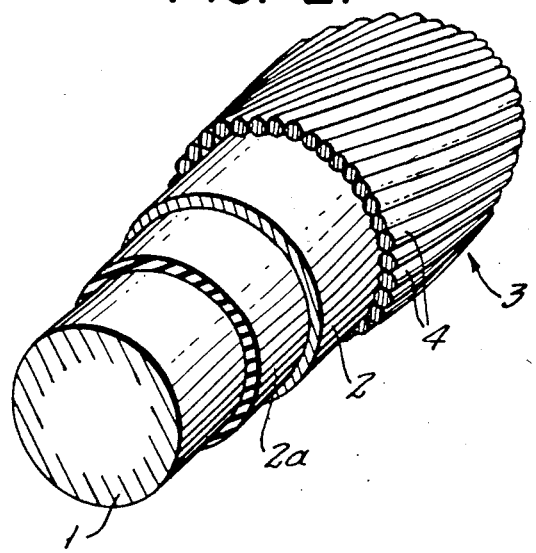
FIG. 2 is similar to FIG. 1 and illustrates a modified embodiment of the invention.

According to another alternative embodiment of the cable which is shown in FIG. 2, the armoring 3 is formed exclusively by bare metallic wires 4, and the sheath 2 is lined by a covering 2a, either of a material having the absorbent hydrogen composition, according to the invention, or by a plastic compound which contains, as a component, an absorbent hydrogen composition, according to the invention.

Figure 3:
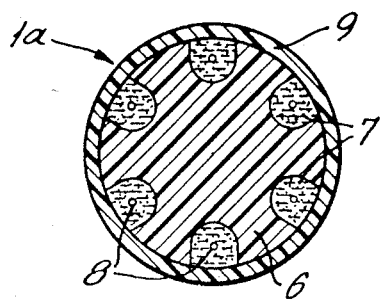
FIG. 3 is a schematic cross-section of an optical fiber cable according to the invention.

For example, the transmitting unit can be the unit 1a illustrated in FIG. 3, but the unit 1a could also form an optical fiber cable by itself.

As shown in FIG. 3, the core comprises a cylindrical, plastic structural shape 6 which is provided, on its outer surface, with a plurality of grooves 7 which extend longitudinally to the structural shape and which have a helicoidal, either a closed helix or an open helix, configuration.

At least one optical fiber 8 is received in each groove 7 and each fiber 8 can be provided either with a loose or a tight protecting layer. Around the structural shape 6, there is disposed a covering 9 which closes the open sides of the grooves 7. The covering 9 can be formed by windings of plastic tapes or, as an alternative, by a layer of extruded plastic material.

The cable 1a shown in FIG. 3 may be provided with a metallic mechanically resistant outer armoring 3 of the type illustrated in FIG. 1.

For the various types of optical fiber cables, the essential element, according to the invention, is to incorporate into its structure, a hydrogen absorbent composition, according to the invention, for protecting the optical fibers disposed inside the cable, with respect to absorption of hydrogen.

For protecting the optical fibers of a cable from absorbing the hydrogen, whether originating inside the cable or in the environment outside the cable, it is sufficient for a hydrogen absorbent composition, according to the invention, to be disposed near the optical fibers, i.e., at a distance of not over 1 cm from the fibers and preferably, at least partially surrounds the optical fibers.

Preferably, for protecting the optical fibers, even with respect to the hydrogen originating inside the cable, a filler, such as, for example, a viscous fluid containing, in appropriate quantities, a hydrogen absorbent composition, according to the invention, is present in the grooves 7. However, the hydrogen absorbent composition may be disposed elsewhere in the cable.

As an alternative, or in addition, the plastic structural shape 6 or the covering 9, or both, can be formed by a hydrogen absorbent composition, according to the invention, or else, they can be formed by a compound of plastic materials which contain a hydrogen absorbent composition according to the invention.

Figure 4:
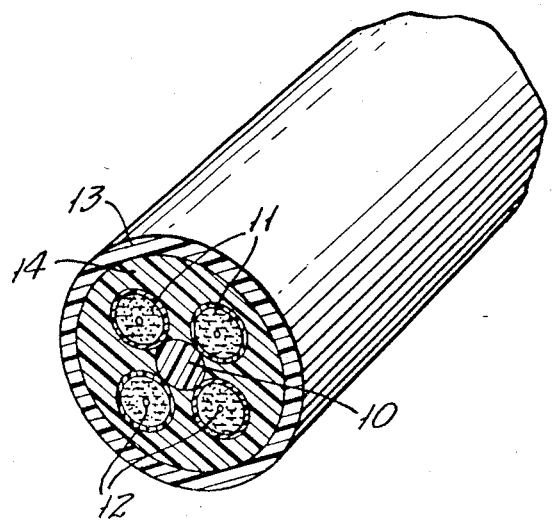
FIG. 4 is a schematic perspective view of an alternative embodiment of an optical fiber cable according to the invention.

In FIG. 4, there is shown, by way of example, another optical fiber cable according to the invention, which is without a metallic armoring surrounding the sheath.

As shown in FIG. 4, the cable has, at its longitudinal axis, an element 10 which is, for example, of a plastic structural shape which may have a traction resistant element or else a metallic rope embedded therein.

Around the element 10, there are disposed, circumferentially and equidistant, a plurality of tubes 11 in each one of which there is loosely housed at least one optical fiber 12.

The tubes 11 and the element 10 are enclosed in a plastic or a metallic sheath 13, and any space which is left in between said sheath 13 and the tubes 11 and the element is filled with a plastic filler 14.

In the cable of FIG. 4, either one, some, or all of the component elements, with the obvious exception of the optical fibers and of any metallic reinforcements therein can be formed by or comprise a hydrogen absorbent composition according to the invention.

For example, when the element 10 has the form of a plastic structural shape, preferably, it comprises a composition according to the invention.

As an alternative or in addition, if the tubes 11 are made of plastic, they may be formed of the hydrogen absorbent composition, or include the hydrogen absorbent composition in the compound out of which they are made.

According to further alternative embodiment, or in addition to the structure described, the filler 14 may be a pasty compound, a powder, or granules made from a hydrogen absorbent composition according to the invention.

Furthermore, a filler can be present inside the tubes 11. Such filler may be, for example, in the form of a fluid (even a viscous fluid), powders, granules, or a mass of plastic comprising a hydrogen absorbent composition according to the invention.

Of course, the cable represented in FIG. 4, can constitute the signal transmitting unit 1 of the cable of FIG. 1. In this case, the armoring 3 can be omitted.

The present invention also includes cable components within its scope, such components incorporating a hydrogen absorbent composition.

Figure 5:
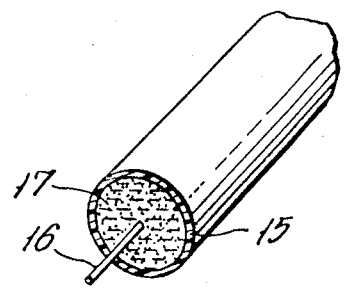
FIG. 5 is a perspective view of a portion of an optical fiber cable component according to the invention.

In FIG. 5, a component for optical fiber cables is illustrated, although such component (or an assembly of said components) can form, by itself or themselves, an optical fiber cable. As shown in FIG. 5, the component is constituted by a plastic or metallic tube 15, inside which an optical fiber 16 is loosely housed. All the space between the tube 15 and the fiber 16 is filled with a filler 17 comprising a hydrogen absorbent fluid composition which can be viscous.

If made of plastic, the tube 15 can also be made out of a solid hydrogen absorbent composition, according to the invention, or else, be made of a plastic compound containing such a composition.

Another component for cables, according to the invention, is constituted by a structural shape made of a solid hydrogen absorbent composition of the invention, or of a material containing said composition, which is to be associated with the cable structure. Examples of said structural shapes are those identified by the reference numerals 5, 6 and 10 in FIGS. 1, 3 and 4, respectively.

A further optical fiber cable component according to the invention, is a filler, either in a liquid (even viscous) form, or else, in the form of powders, or granules, each made of a hydrogen absorbent composition, or containing said composition.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A hydrogen absorbing composition for optical fiber cables and their components formed by a mixture which comprises:
   an unsaturated polymer selected from the group consisting of:
   (a) unsaturated homopolymers obtained through the polymerization of monomers selected from the group consisting of butadiene, pentadiene, methylbutadiene and 2-chlorobutadiene,
   (b) unsaturated interpolymers obtained through the polymerization between:
      (i) a first monomer selected from the group consisting of butadiene, pentadiene, methylbutadiene and 2-chlorobutadiene, and
      (ii) a second monomer selected from the group consisting of styrene, 4-vinylpyridine and acrylonitrile, and (c) unsaturated polymers obtained by grafting to the homopolymers of (a) and the interpolymers of (b) monomers containing at least one unsaturated group selected from the group consisting of vinyl, allyl and mixtures thereof, and a catalyst selected from the group consisting of palladium powder, platinum powder, nickel powder, iron pentacarbonyl copper chromite and mixtures of two or more thereof whereby when said composition is inside an optical fiber cable or an optical fiber cable component, said composition, at ambient temperature, is able to form a protective barrier for the optical fiber cable or the optical fiber cable component against at least traces of hydrogen by chemically blocking said hydrogen.

2. A hydrogen absorbing composition as set forth in claim 1 wherein said catalyst is supported on an inert material.

3. A hydrogen absorbing composition as set forth in claim 1 wherein said unsaturated polymer is (a) an unsaturated homopolymer obtained through the polymerization of monomers selected from the group consisting of butadiene, pentadiene, methylbutadiene and 2-chlorobutadiene.

4. A hydrogen absorbing composition as set forth in claim 3 wherein, in said unsaturated homopolymer (a), the component monomers are linked to one another, at the 1 and 4 positions.

5. A hydrogen absorbing composition as set forth in claim 3 wherein, in said unsaturated homopolymer (a), the component monommers are linked to one another at the 1- and 2-positions.

6. A hydrogen absorbing composition as set forth in claim 1 wherein said unsaturated polymer is (b) an interpolymer obtained through the polymerization between (i) a first monomer selected from the group consisting of butadiene, pentadiene, methylbutadiene and 2-chlorobutadiene, and (ii) a second monomer selected from the group consisting of styrene, 4-vinylpyridine and acrylonitrile.

7. A hydrogen absorbing composition as set forth in claim 1 wherein said unsaturated polymer is (c) unsaturated polymers obtained by grafting to the homopolymers of (a) and the interpolymers of (b) monomers containing at least one unsaturated group selected from the group consisting of vinyl, allyl and mixtures thereof.

8. Optical fiber cable components comprising (a) at least one optical fiber, and (b) a hydrogen absorbent composition, constituted by a mixture which comprises an unsaturated polymer obtained through the polymerization of at least conjugated diene-monomers and a catalyst selected from the group consisting of the transition metals, the inorganic and organometallic salts of the transition metals, the organometallic acids of said transition metals and mixtures of two or more thereof.

9. Optical fiber cable components as set forth in claim 8 wherein said hydrogen absorbent composition (b) is included in a plastic material.

10. Optical fiber cable components as set forth in claim 8 wherein (b) is constituted by a fluid filler comprising said hydrogen absorbent composition.

11. Optical fiber cable components as set forth in claim 10 wherein said filler is a powder.

12. An optical fiber cable component comprising a tube of a plastic material having at least one optical fiber therein; said plastic material including a hydrogen absorbent composition, constituted by a mixture which comprises an unsaturated polymer obtained through the polymerization of at least conjugated diene-monomers and a catalyst selected from the group consisting of the transition metals, the inorganic and organometallic salts of the transition metals, the organometallic acids of said transition metals and mixtures of two or more thereof.

13. An optical fiber cable having at least one mechanically resistant component and comprising a signal transmitting unit including at least one optical fiber, a sheath enclosing the signal transmitting unit and an unsaturated polymeric composition made from a mixture comprising an unsaturated polymer obtained through the polymerization of at least conjugated diene-monomers and a catalyst selected from the group consisting of the transition metals, the inorganic and organometallic salts of the transition metals, the organometallic acids of said transition metals and mixtures of two or more thereof.

14. An optical fiber cable as set forth in claim 13 wherein said catalyst is supported on an inert material.

15. An optical fiber cable as set forth in claim 13 wherein said unsaturated polymer is an unsaturated homopolymer obtained through the polymerization of monomers selected from the group consisting of butadiene, pentadiene, methylbutadiene and 2-chlorobutadiene.

16. An optical fiber cable as set forth in claim 13 wherein said unsaturated polymer is an interpolymer obtained through the polymerization between a first monomer selected from the group consisting of butadiene, pentadiene, methylbutadiene and 2-chlorobutadiene, and a second polymer selected from the group consisting of styrene, 4-vinylpyridine and acrylonitrile.

17. An optical fiber cable as set forth in claim 13 wherein said unsaturated polymer has monomers grafted thereto, each said monomer containing at least one unsaturated group.

18. An optical fiber cable as set forth in claim 17 wherein said monomers are selected from the group consisting of monomers which, after being grafted, contain at least one group selected from vinyl groups, allyl groups and mixtures thereof.

19. An optical fiber cable as set forth in claim 13 wherein said catalyst is selected from the group consisting of palladium powder, platinum powder, nickel powder, iron pentacarbonyl, copper chromite and mixtures of two or more thereof.

20. An optical fiber cable as set forth in claim 19 wherein said catalyst is supported on an inert material.

21. An optical fiber cable as set forth in claim 13 wherein said mechanically resistant element is a metal armoring outside of said sheath which encloses said signal transmitting unit, said armoring comprising at least one structural element made of a polymeric compound which includes said unsaturated polymeric composition.

22. A optical fiber cable as set forth in claim 13 wherein said mechanically resistant element is a metal armoring outside the sheath which encloses said signal transmitting unit, said armoring having a plurality of elements and at least a plurality of said elements having a layer thereon containing at least said unsaturated polymeric composition.

23. An optical fiber cable as set forth in claim 13 wherein said mechanically resistant armoring encloses said sheath and further comprising a layer containing at least said unsaturated polymeric composition on the inner surface of said sheath.

24. An optical fiber cable as set forth in claim 13 wherein said unsaturated polymeric composition is disposed within 1 cm of said optical fiber.

25. An optical fiber cable as set forth in claim 24 wherein said unsaturated polymeric composition at least partially surrounds said optical fiber.

26. An optical fiber cable as set forth in claim 25 wherein said unsaturated polymeric composition is at least a component of a fluid filler.

27. An optical fiber cable as set forth in claim 26 wherein said optical fiber is surrounded by a plastic tube which loosely receives said optical fiber, said unsaturated polymeric composition being at least a component of the composition of said tube.

28. An optical fiber cable as set forth in claim 13 wherein said signal transmitting unit comprises centrally thereof at least one structural element made of a plastic compound, said unsaturated polymeric composition being a component of said plastic compound.

* * * * *